Patented Mar. 19, 1935

1,994,853

UNITED STATES PATENT OFFICE 1,994,853

GONAD-STIMULATING SUBSTANCE AND PROCESS OF PRODUCING IT

Harold H. Cole and George H. Hart, Davis, Calif.

No Drawing. Application March 10, 1932, Serial No. 598,087

2 Claims. (Cl. 167—74)

It is the object of our invention to produce from the blood of pregnant mares, a hitherto unknown source, a product which stimulates the sex sphere, and especially one which stimulates the gonads. When such a product is injected into immature animals, it causes a change by which their gonads are stimulated and their sex organs come to resemble those of mature animals.

We have discovered that the blood of pregnant mares, especially during a certain intermediate stage of pregnancy, contains a substance (hormone) which has these properties in a high degree. If such blood, or the serum (a blood-fraction) obtained therefrom, is administered parenterally, it is found to stimulate the sex sphere generally, and especially to stimulate the gonads, and to cause changes in immature animals by which their sex organs come to resemble those of mature animals. If administered to immature male animals, there results a marked development of the testes and a remarkable development of the accessory organs. If administered to immature females, it causes the formation of Graafian follicles and the appearance of corpora lutea, accompanied by simultaneous changes in the entire sex sphere.

This is easily recognized by tests on immature female rats. Such rats are normally weaned when about twenty-two days old; and practically never normally reach sexual maturity until they are at least thirty-five days old. If the blood or blood-serum of pregnant mares is administered parenterally to female rats twenty-three days old, or immediately after they have been weaned, either in one injection or in several injections over a period of three days, and the rats are killed at the end of one hundred hours after the first injection, the ovaries are found to be materially increased in size over those of controls, and in each of a majority of treated rats there appears at least one corpus luteum.

This action is in contradistinction to that of the estrogenic principle or hormone, of Allen-Doisy and of Frank, which stimulates the secondary sex organs only and not the gonads directly.

The mare's blood contains this sex-stimulating substance to some extent between the thirty-seventh day and the one hundred and thirtieth day of gestation; but it is particularly abundant between the forty-fifth day and the one hundredth day of gestation. This latter period during which the substance is markedly present in mares' blood is during that period of gestation when the fetus is between 2 and 22 cm. in length, which is more easily determinable in slaughtered mares than is the precise period of gestation as measured in days.

The blood from pregnant mares may be obtained in the usual manner of blood used for biological purposes, either from the live animal or from the slaughtered animal.

While the whole blood may be used, that is not desirable for many reasons; such as the tendency to clot, and the presence of corpuscles. Therefore, we prefer to use a fraction of the blood from which non-serum constituents have been removed; and particularly to use only the serum, obtainable from the blood in any convenient way.

If a total of 2 cc. of the blood-serum obtained from pregnant mares between the forty-fifth day and the one hundredth day of gestation is injected into 23-day old rats, either in a single dose or in divided doses over a period of three days, and the rats are killed after one hundred hours from the first dose, it is found that the ovaries are much larger than in untreated rats of the same age, and will average at least 200 mg. in weight as against an average of less than 50 mg. in the untreated rats; and that such ovaries in the treated rats show at least one corpus luteum in each of at least half of the rats. Indeed, this appearance of corpus lutea in at least half of the rats is obtainable with much smaller doses, even with a total dose per rat of less than 1 cc. A dose of as little as 0.01 cc. of the serum is capable in one hundred hours of producing noticeable ovarian development in treated immature rats.

The blood of pregnant mares is apparently substantially free from any growth-promoting hormone, and so is the gonad-stimulating product which we obtain from such blood.

Our product is indicated in various deficiency disorders and subnormal developments of the sexual system, both male and female.

It induces ovulation and produces estrum, as has been shown by tests on various female test animals, such as the rat, mouse, cow, and ewe. It repairs libido sexualis, as has been shown by tests on impotent male animals, such as rats, rams, and stallions, and has enabled such males to breed. Through its control of the gonads, it has been shown by tests on these animals to stimulate the secondary sex organs and the sex behavior.

As our product is tested by its effect in producing enlargement of the ovaries in immature rats, and in causing the appearance of corpora lutea in said ovaries, and as it is obtainable from mares' blood only when the mares are pregnant, our invention furnishes a valuable means for testing mares for pregnancy before other indications give any certain information thereof. For such a test, as to determine whether a service by a stallion has been successful to produce pregnancy, and thus to avoid loss of valuable breeding time in the mare's life, blood is taken from the mare about two months after the stallion's service, and a product obtained therefrom in accordance with our procedure is tested by being administered parenterally to immature female rats. If the ovaries of the rats, when the rats are killed after 100 hours after the first injection, are found to be materially increased in size over those of controls, and if corpora lutea appear in the majority of the test rats, the mare under observation is pregnant; but if the rat test is negative, and the rat ovaries are not increased in size and there are no corpora lutea, the mare has not become pregnant; in which case, in order to avoid the waste of valuable breeding time, another service by the stallion may be had.

We claim as our invention:

1. The process of obtaining a product capable of stimulating the gonads, comprising drawing blood from pregnant mares which are between the thirty-seventh day and the one hundred and thirtieth day of gestation, and separating the serum from such blood.

2. A gonad stimulating and developing product derived from the blood of pregnant mares between the thirty-seventh day and the one hundred and thirtieth day of gestation, said product being capable of stimulating and developing the gonads of males and females.

HAROLD H. COLE.
GEORGE H. HART.